United States Patent
Eller et al.

(10) Patent No.: US 10,153,980 B2
(45) Date of Patent: Dec. 11, 2018

(54) SYSTEMS AND METHODS FOR MANAGING NETWORK CONGESTION

(71) Applicant: CoCo Communications Corp., Seattle, WA (US)

(72) Inventors: A. Riley Eller, Seattle, WA (US); Dennis M. Edwards, Everett, WA (US)

(73) Assignee: COCO COMMUNICATIONS CORP, Seattle, WA (US)

( * ) Notice: Subject to any disclaimer, the term of this patent is extended or adjusted under 35 U.S.C. 154(b) by 0 days.

(21) Appl. No.: 15/213,759

(22) Filed: Jul. 19, 2016

(65) Prior Publication Data
US 2018/0026897 A1    Jan. 25, 2018

(51) Int. Cl.
*H04L 12/807*     (2013.01)
*H04L 12/26*      (2006.01)
*H04L 12/801*     (2013.01)

(52) U.S. Cl.
CPC ............ *H04L 47/27* (2013.01); *H04L 43/045* (2013.01); *H04L 43/067* (2013.01); *H04L 43/0882* (2013.01); *H04L 47/127* (2013.01)

(58) Field of Classification Search
CPC ................. H04L 43/0829; H04L 43/16; H04L 41/0213; H04L 41/0816; H04L 41/0823; H04L 41/12; H04L 41/145; H04L 41/5009; H04L 43/00; H04L 43/026; H04L 43/028; H04L 43/08; H04L 43/0817; H04L 43/0823; H04L 43/0858; H04L 43/087
USPC ......................................................... 370/234
See application file for complete search history.

(56) References Cited

U.S. PATENT DOCUMENTS

| | | |
|---|---|---|
| 6,144,639 A | 11/2000 | Zhao et al. |
| 6,333,917 B1 | 12/2001 | Lyon et al. |
| 6,526,022 B1 | 2/2003 | Chiu et al. |
| 6,532,214 B1 | 3/2003 | Rumsewicz |
| 6,674,717 B1 | 1/2004 | Duong-Van et al. |
| 6,826,151 B1 | 11/2004 | Li et al. |
| 6,850,769 B2 | 2/2005 | Grob et al. |
| 6,917,585 B1 | 7/2005 | Firoiu et al. |
| 6,990,071 B2 | 1/2006 | Adam et al. |
| 7,277,843 B1 | 10/2007 | Wen et al. |
| 7,301,907 B2 | 11/2007 | Anbarani |
| 7,454,527 B2 | 11/2008 | Zhang et al. |
| 7,782,777 B2 | 8/2010 | Kilkki et al. |
| 7,843,828 B2 | 11/2010 | Key et al. |
| 7,889,654 B2 | 2/2011 | Ramakrishnan et al. |
| 8,004,989 B2 | 8/2011 | Shimonishi |
| 8,209,433 B2 | 6/2012 | Eller et al. |
| 8,248,936 B2 | 8/2012 | Kantawala et al. |
| 8,255,188 B2 | 8/2012 | Tabatabaei |
| 8,345,551 B2 | 1/2013 | Wakuda et al. |

(Continued)

*Primary Examiner* — Natasha W Cosme
(74) *Attorney, Agent, or Firm* — Lowe Graham Jones PLLC; Raymond Armentrout

(57) ABSTRACT

Techniques for managing congestion in a computer network are described. In some examples a network node uses a dynamic moving average to determine a level of network congestion a computer network. The dynamic moving average uses a window that is dynamically resized based on the contents of the window. For example, when the contents of the half of the window containing older samples are sufficiently different from the contents of the half of the window containing newer samples, the older samples are discarded and an average is calculated using just the newer samples.

24 Claims, 9 Drawing Sheets

(56) References Cited

U.S. PATENT DOCUMENTS

| | | |
|---|---|---|
| 8,385,201 B2 | 2/2013 | Cohen et al. |
| 8,446,452 B2 | 5/2013 | Hosseini et al. |
| 8,451,736 B2 | 5/2013 | Zolfaghari et al. |
| 8,483,701 B2 | 7/2013 | Monnes et al. |
| 8,537,675 B2 | 9/2013 | Ramakrishnan et al. |
| 8,553,540 B2 | 10/2013 | Mehrotra et al. |
| 8,605,605 B1 | 12/2013 | Vadlakonda et al. |
| 8,699,341 B2 | 4/2014 | Likar et al. |
| 8,719,398 B2 | 5/2014 | Qian et al. |
| 8,730,806 B2 | 5/2014 | Zhang |
| 8,738,986 B2 | 5/2014 | Srinivas et al. |
| 8,811,178 B2 | 8/2014 | Kutscher et al. |
| 8,873,393 B2 | 10/2014 | Camps et al. |
| 8,880,681 B2 | 11/2014 | Moncaster et al. |
| 8,971,184 B2 | 3/2015 | Howe et al. |
| 9,072,050 B2 | 6/2015 | Homchaudhuri et al. |
| 9,094,853 B2 | 7/2015 | Ghandan et al. |
| 9,179,353 B2 | 11/2015 | Ghandan et al. |
| 9,197,565 B2 | 11/2015 | Khanchi et al. |
| 9,215,157 B2 | 12/2015 | Qian et al. |
| 9,258,234 B1 | 2/2016 | Addepalli et al. |
| 2005/0226150 A1 | 10/2005 | Santos et al. |
| 2006/0176824 A1 | 8/2006 | Laver et al. |
| 2009/0111497 A1* | 4/2009 | Bitter .................. H04W 36/06 455/513 |
| 2012/0265877 A1 | 10/2012 | Eller et al. |
| 2014/0293788 A1 | 10/2014 | Ibasco et al. |
| 2015/0023174 A1 | 1/2015 | Dasgupta et al. |

\* cited by examiner

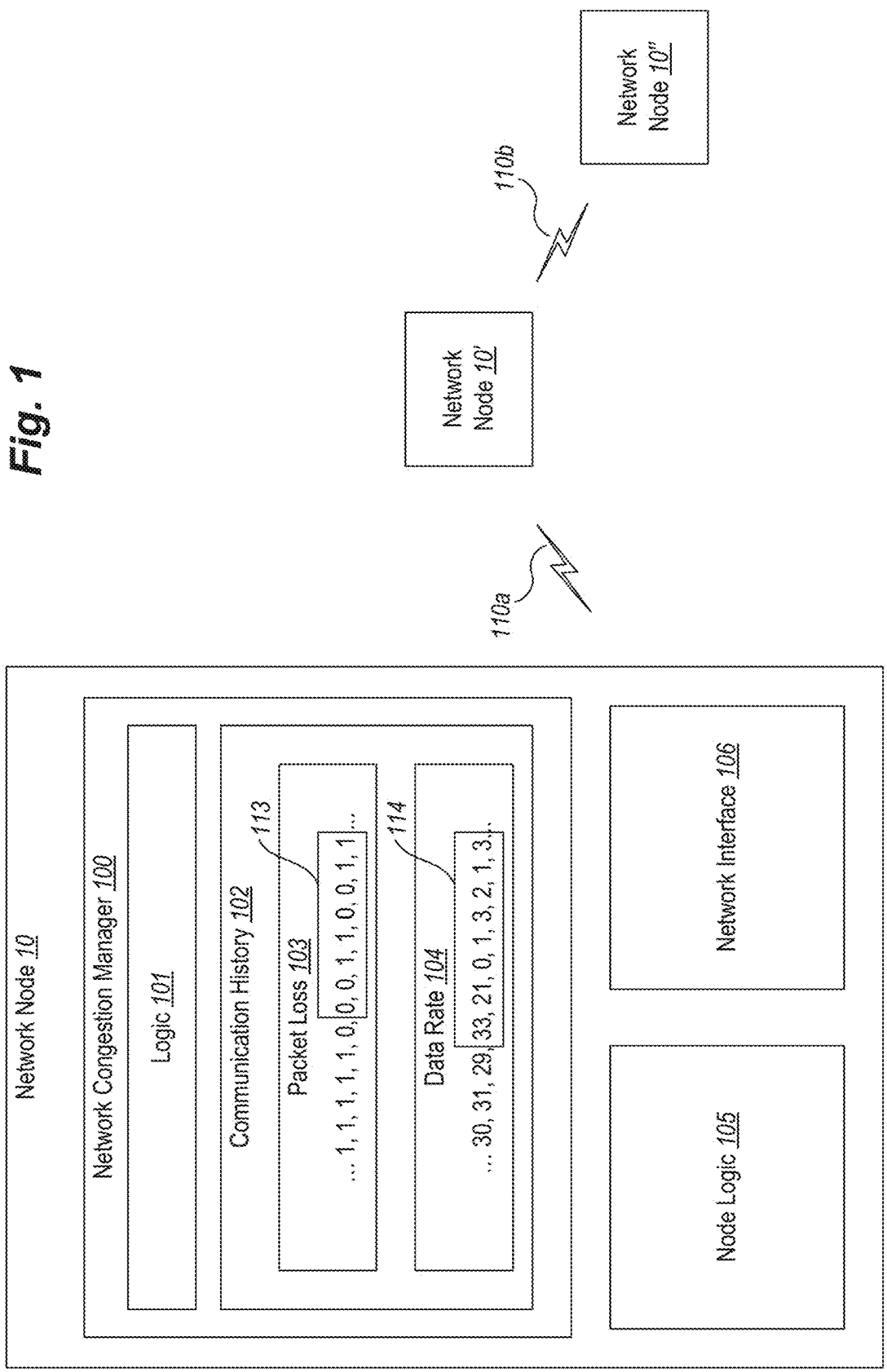

Fig. 2A ~200

| Time | Window | | | | | | | Dynamic | Fixed |
|---|---|---|---|---|---|---|---|---|---|
| 1 | 30 | | | | | | | 30 | 30 |
| 2 | 30 | 29 | | | | | | 29.5 | 29.5 |
| 3 | 30 | 29 | 28 | | | | | 29 | 29 |
| 4 | 30 | 29 | 28 | 30 | | | | 29.3 | 29.3 |
| 5 | 30 | 29 | 28 | 30 | 32 | | | 29.8 | 29.8 |
| 6 | 30 | 29 | 28 | 30 | 32 | 30 | | 29.8 | 29.8 |
| 7 | 30 | 29 | 28 | 30 | 32 | 30 | 29 | 29.7 | 29.7 |
| 8 | 30 | 29 | 28 | 30 | 32 | 30 | 29 | 0 | 26 | 26 |
| 9 | 30 | 29 | 28 | 30 | 32 | 30 | 29 | 0 | 0 | 14.8 | 22.3 |
| 10 | 30 | 29 | 28 | 30 | 32 | 30 | 29 | 0 | 0 | 2 | 1 | 18.9 |
| 11 | 30 | 29 | 28 | 30 | 32 | 30 | 29 | 0 | 0 | 2 | 3 | 1.7 | 15.8 |
| 12 | 30 | 29 | 28 | 30 | 32 | 30 | 29 | 0 | 0 | 2 | 3 | 25 | 14 | 15.1 |
| 13 | 30 | 29 | 28 | 30 | 32 | 30 | 29 | 0 | 0 | 2 | 3 | 25 | 0 | 9.3 | 11.3 |
| 14 | 30 | 29 | 28 | 30 | 32 | 30 | 29 | 0 | 0 | 2 | 3 | 25 | 0 | 3 | 1.5 | 7.8 |
| 15 | 30 | 29 | 28 | 30 | 32 | 30 | 29 | 0 | 0 | 2 | 3 | 25 | 0 | 3 | 1 | 1.3 | 4.25 |

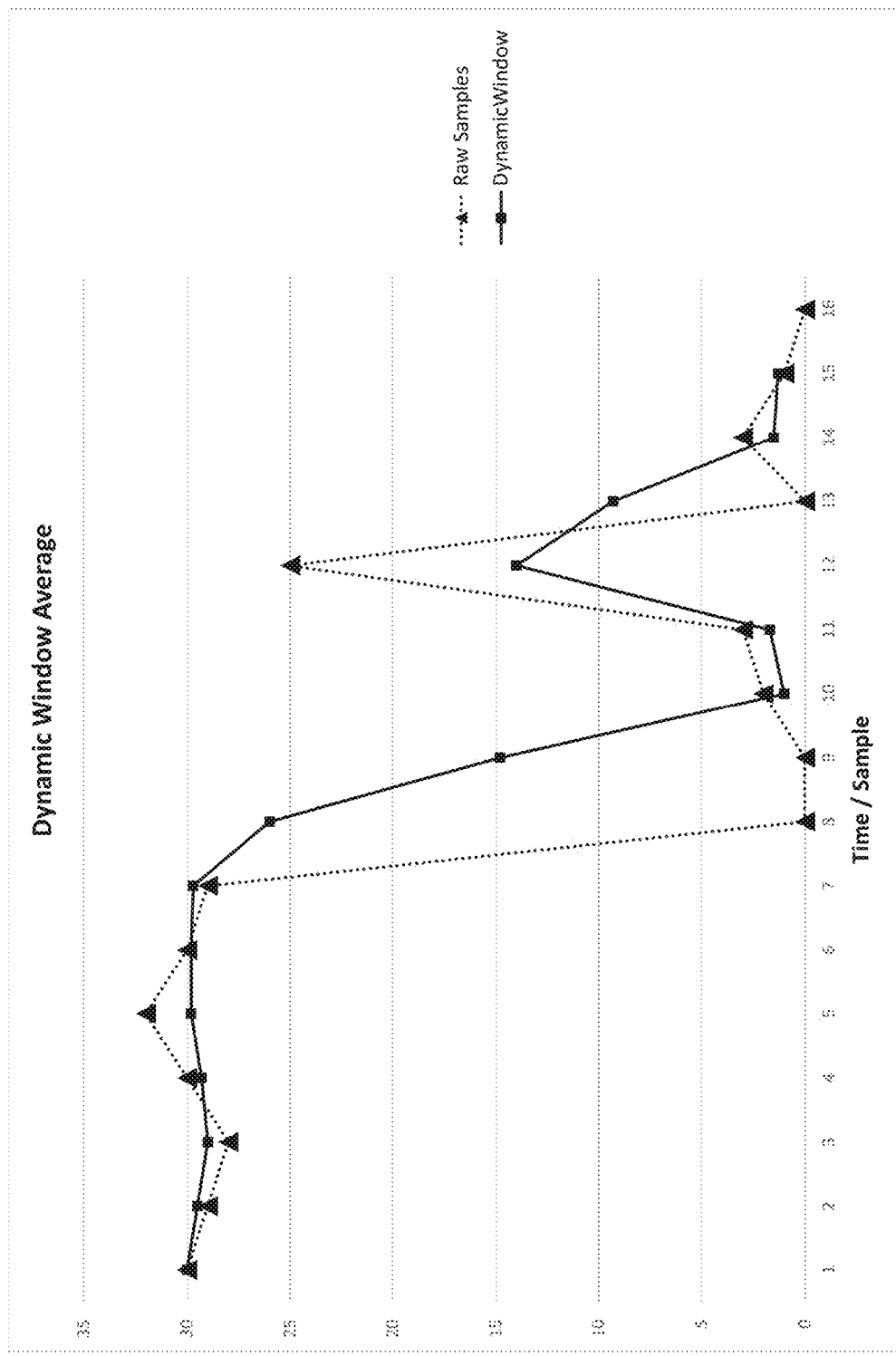

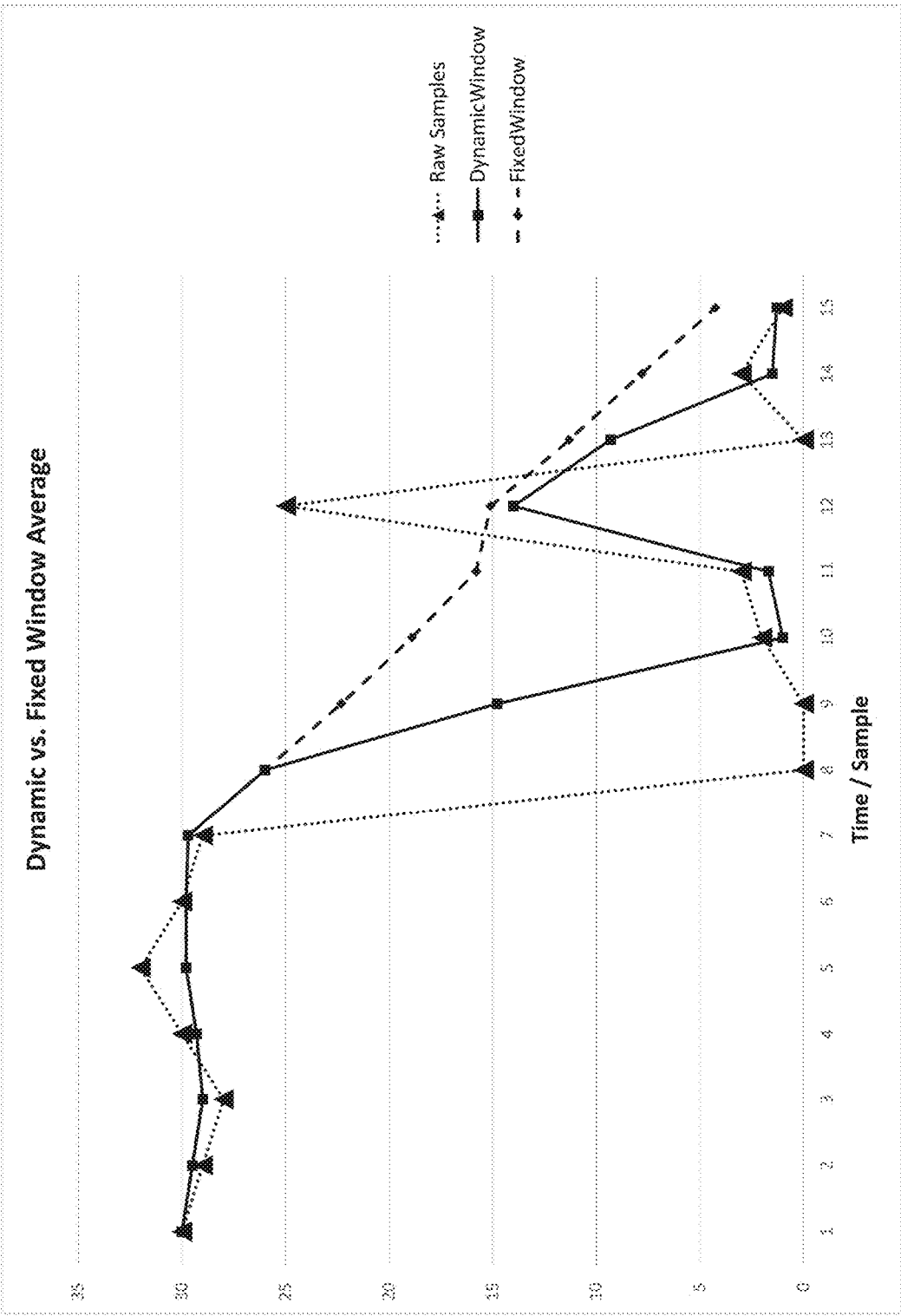

SYSTEMS AND METHODS FOR MANAGING NETWORK CONGESTION

TECHNICAL FIELD

The present disclosure relates to methods, techniques, and systems for managing congestion in a shared resource and, more particularly, to methods, techniques, and systems for using a dynamic moving average to determine a level of network congestion in a shared resource such as a computer network.

BACKGROUND

A moving average is a statistical technique for determining a mean of a subset of a series of data points. Given a series of data items, the moving average is initially determined by calculating the mean of items in an initial subset of the data, for example, the first 10 items in the series. The next moving average is calculated by removing from the subset the first item in the series, adding to the subset the next item in the series, and then again calculating the mean. The moving average thus forms a "window" that moves successively along the time series. At each position, the window defines the number of recent items to use for calculation of the mean.

The moving average is commonly used to smooth short-term variability in a time series of data. However, the moving average is subject to a number of shortcomings. For example, the effectiveness of a moving average for a given application is highly dependent on the window size. If the window size is too large, then high frequency signals will be largely or completely eliminated. Similarly, the average will be slow to respond to sudden changes. On the other hand, if the window size is too small, the average will be over-responsive to changing conditions, possibly leading to over-dynamic system behavior.

BRIEF DESCRIPTION OF THE DRAWINGS

FIG. 1 is a block diagram that illustrates a network congestion manager according to one embodiment.

FIGS. 2A-2D illustrate dynamic windowing according to example embodiments.

DETAILED DESCRIPTION

Figure 2B:
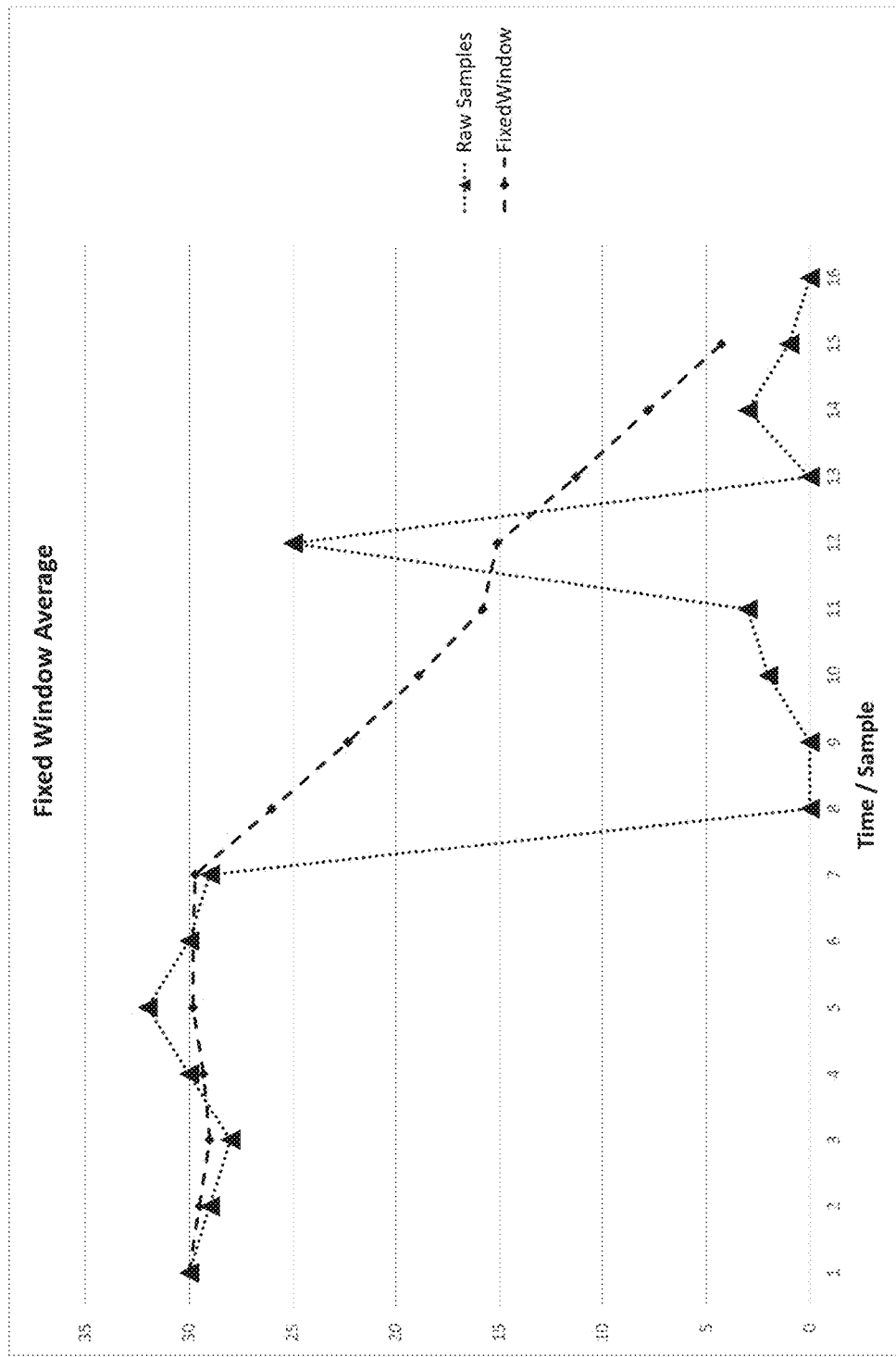

Embodiments described herein provide enhanced computer- and network-based methods, devices, and systems for managing congestion in a shared resource and, more particularly, to methods, techniques, and systems for using a dynamic moving average to determine a level of network congestion in a shared resource such as a computer network.

By way of introduction, one embodiment determines and measures network congestion by maintaining a history of data values that reflect the performance of the network over time. A dynamic window is used to determine average recent network behavior, performance, and/or other metrics. For example, the history may include data that reflects packet loss or success, data rate, network noise levels, or the like. The dynamic window may then be used, for example, to determine a level of network congestion by calculating an average data rate over the values in the window.

The dynamic window is resized based on a statistical analysis of the values in the window. In some embodiments, values in a first portion of the window are compared to values in a second portion of the window. If the values are different according to some statistical measure, then the window is shortened (e.g., halved in size). Various statistical measures can be used, such as a t-test that determines whether the means of the values of the first and second portions are statistically different. Typically, the first portion of the window is about the first half of the window, containing newer or more recently received data values. The second portion of the window is about the second half of the window, containing older data items. The window can be divided in other ways, or other statistical metrics can be employed, as discussed below.

In some embodiments, at least two distinct types of data are tracked in the history.

For example, a networking embodiment may maintain a history that includes first data items that indicate packet transmission loss/success and second data items that indicate network data rate. One set of data items (e.g., packet loss) may then be used for discrimination purposes—in other words, to determine when the dynamic window should be resized. The other set of data items (e.g., data rate) may then be used as a source of values for determining a level of network congestion, such as an average data rate over the current window size.

The described techniques address shortcomings with averaging techniques employed in the context of computer networking. The use of fixed window averages can lead to ineffective or inefficient utilization of network bandwidth. For example, in the context of a wireless network, hosts may track an average latency, packet success rate, or other metric to determine various networking parameters or operations, such as packet retransmission, power level, or the like. A burst of network activity can create a short term spike in packet loss. If the size of the fixed window is too large, the spike may go initially unnoticed. However, because the spike will likely cause packet loss, hosts will start resending packets, thereby worsening congestion. On the other hand, if the size of the fixed window is too small, hosts may become overresponsive to small changes in network behavior, also resulting in pathological behavior. For example, in a wireless context, a change in network conditions (e.g., caused by additional network traffic, RF interference, etc.) can cause nodes in the network to modify their routing behavior and/or adjust their networking parameters (e.g., radio power levels, back-off intervals). Such changes all come with a cost, and it is important that they not be made in response to every slight disruption or variation in the network.

Although the techniques are described herein primarily in the context of computer networking, other applications are contemplated. In general, the described dynamic window techniques can be used to detect and measure congestion of any shared resource. For example, the described dynamic window techniques can be employed for computer bus management, autonomous or semi-autonomous vehicle (e.g., automobile) control systems, human queueing applications, or the like. Additional details related to some of these applications are provided below.

1. Overview

FIG. 1 is a block diagram that illustrates a network congestion manager according to one embodiment. More particularly, FIG. 1 shows a network node 10 that includes a network congestion manager 100, node logic 105, and a network interface 106. In this example, the network node 10 communicates wirelessly with other nodes 10' and 10". Each of the nodes 10 can be any type of computing device that is configured to communicate via one or more wireless protocols, such as a mobile computing device (e.g., a smart phone, tablet, laptop computer), a network device (e.g., a wireless access point, a switch, a router), a fixed computing device (e.g., a desktop or server computer), or the like.

The network congestion manager ("NCM") 105 includes logic 101 and a communication history 102. The logic 101 interacts with the network interface 106 and/or the node logic 105 to obtain and record information about network performance, behavior or events; identify instances of network congestion; determine levels of network congestion; and the like. The logic 101 may also adjust parameters or otherwise modify network performance by instructing or notifying other components, such as the network interface 106. For example, when congestion is detected, the logic 101 may instruct the network interface 106 to take actions to reduce congestion.

In the illustrated embodiment, the logic 101 obtains information about packet loss and data rate from the network interface 106, and stores that information as packet loss history 103 and data rate history 104. For example, every time the network interface 106 learns about the outcome of a packet transmission (e.g., successful transmission or dropped packet) of a packet, the network interface 106 can notify the logic of that outcome, possibly along with other information, such as data transmission rate, noise level, etc. In other embodiments, the logic 101 may "sample" the network interface 106 from time to time (e.g., every millisecond, every 10 milliseconds) to request performance-related information, including packet transmission loss/success, data rates, noise levels, power consumption, queue length, or the like. In general, the logic 101 and the network interface 106 may communicate in any suitable manner, including by polling, publish-subscribe, event delivery, or the like. In some embodiments, communication between the logic 101 and the network interface 106 may be intermediated at least in part by the node logic 105.

The communication history 102 is a repository of data that represents information about the performance and/or behavior of the network interface 106 and/or the wireless links to nodes 10' and/or 10". In the illustrated embodiment, the history 102 includes a packet loss history 103 and a data rate history 104. The packet loss history 103 and a data rate history 104 each represent a time series of values that reflect some property of wireless links associated with node 10, as reported by the network interface 106 or some other source. In this example, the packet loss history 103 is a series of 1s and 0s that are used to respectively represent successful and unsuccessful packet transmissions. The data rate history 104 represents the transmission data rate used at a particular point or period in time, such as during the transmission of a network packet.

Each of the histories 103 and 104 includes a corresponding window 113 and 114. Each window is used to identify the set of data values that are used to compute a moving average. As will be further discussed below, the windows 113 and 114 are dynamically sized in response to statistical properties of the window contents. In some embodiments, the sizes of both windows are determined by the statistical properties of just one of the windows. For example, the size of windows 113 and 114 may be based on the contents of just window 113.

Each history 103 and 104 typically stores a bounded number of data items. In typical embodiments, this maximum number of data items stored by a history is the same as the current window size. In other cases, such as to support debugging or multiple window sizes, the number of data items in the history is bounded by a maximum value that is at least as large as the maximum possible window size.

Although histories 102 and 103 are shown as separate data structures, in some embodiments they may be merged into a single history that includes tuples of network information. Each history 102 and 103 is typically represented and stored in computer memory by way of a buffer (e.g., FIFO, circular buffer) implemented as an array. The histories 102 and 103 change the structure of the computer memory in a way that is perceptible by the instructions of logic 101. The logic 101 physically modifies the histories 102 and 103 depending on their contents (e.g., their data values) and structure (e.g., their length). For example, the logic 101 causes the histories to grow or shrink depending on their contents and current length.

The present invention addresses a number of shortcomings associated with prior art networking technologies. As a general matter, to communicate a message through a network comprised of at least one connection requires identifying the potential (valid, existing) sequences of devices (paths) which begin with the originating device, end with the destination device, and traverse zero or more intermediaries. Selecting from among that set of one or more options requires some means of assessing the (physical) cost (in joules or seconds of resource consumption) that each would incur, and then prioritizing the path that is expected to utilize the fewest resources.

It is impossible to be certain whether network conditions at a future moment will be exactly consistent with recent historical observations. Packet loss is also always a possibility due to spikes in systemic noise caused by heat, cosmic radiation, or intermittent sources of interference like microwave ovens. To cope with all of this physical variability, averaging is used to derive an expectation of near-term future performance.

The more samples that are included in the average, the less variance there is in the estimate. This has a consequence of causing network path selection to opt for the same paths for a long period of time. If instead fewer samples are considered in the estimate of network conditions, then paths can change more quickly.

These methods are good in some cases, bad in others, and in direct conflict with each other. When the external environment is relatively stable then a large sample set offers the best possible path selection and a small sample set can cause poor path selection. Precision of path selection is therefore directly proportional to sample size. However, when conditions in the environment are dynamic, smaller numbers of samples achieve much greater responsiveness of path selection and large numbers of samples cause the network to "stick" to paths that are no longer optimal.

The described techniques which rely on a dynamic window offer a smooth transition between precise estimates in stable situations and accurate estimates when network conditions are in motion or otherwise variable. As a result, network elements using this mechanism consistently achieve greater packet throughput than traditional alternatives.

For example, in FIG. 1, there is a first wireless link 110*a* that links node 10 and 10', and a second wireless link 110*b* that links node 10' and 10". There is no direct wireless link between nodes 10 and 10". This state of affairs exists because a single wireless link between nodes 10 and 10" is more expensive than using the two links 110a and 110b. For example, nodes 10 and 10" may be separated by a distance that is greater than the transmission range the nodes. As another example, it may be possible to establish a link between nodes 10 and 10", but the power required to do so is greater than that relying on intermediate node 10' to facilitate message transmission. When the nodes are mobile devices, conditions are frequently changing (e.g., because the nodes are in motion with respect to each other), meaning that decisions about how to route messages need to be frequently updated. While it may be true one moment that a message is most efficiently transmitted from node 10 to node 10" via node 10', that may not be the case at a later time when the distances (or other conditions) between the nodes change.

Prior art approaches perform particularly poorly when the cost of direct transmission from node 10 to node 10" is about the same as the cost of indirect transmission from node 10 to node 10" (via node 10'). In particular, if node 10 were to use a prior art fixed window with a size that is too large, it will be slow to respond to changing conditions that make it beneficial to switch from direct to indirect transmission, or vice versa. On the other hand, if the fixed window is too small, node 10 may flip-flop between direct and indirect transmission every time there is a minor change in conditions. By using the dynamic window techniques described herein, node 10 will be able to make routing decisions that are stable yet sufficiently responsive to changed conditions, thereby avoiding the costs associated with overcorrecting in response to every change.

The described techniques will cause node 10 to make networking decisions in response to changed network conditions. In some embodiments, node 10 periodically transmits a broadcast packet that is used to develop and maintain information about the state of the network, such as whether a given host is directly reachable and metrics associated with each link (or potential link), such as noise levels, latency, lossiness, and the like. By applying the moving average technique to the stored metrics for each of the potential hosts or links, node 10 can make intelligent decisions about how best to perform its networking functions. For example, in response to a determined level of congestion (e.g., determined by packet loss or noise level on the link between node 10 and node 10'), node 10 can elect to instead transmit packets directly to node 10" without using node 10' as an intermediary. In some cases, congestion levels for each network link will be considered, such as by comparing a first congestion level determined for the link between nodes 10 and 10' and a second congestion level determined for the link between nodes 10 and 10".

FIGS. 2A-2D illustrate dynamic windowing according to example embodiments. In particular, FIGS. 2A-2D illustrate the application of dynamic windowing to determine the existence and/or level of network congestion.

FIG. 2A shows a table 200 that includes four columns labeled Time, Window, Dynamic, and Fixed. Each row of table 200 shows a time series of network performance measurements at successive points in time. In this example, each measurement represents data rate (e.g., data rate history 104) in units of megabits/second. For example, at time 1, the row includes a single sample (30) that reflects an initial bandwidth measurement of 30 Mb/s. At time 2, the row includes an additional sample (29) that reflects a measurement of 29 Mb/s, taken at some time after the first measurement of 30 Mb/s. At time 15, the row includes a total of 15 samples, reflecting the 15 measurements respectively taken at times 1-15.

Each row of table 200 also includes a representation of the state of the dynamic window at a given point in time. In this example, the window has a minimum size of 2 and a maximum size of 8. As new data values are added to the history, the window grows. Thus, in time 1 (the initial condition) the window includes a single value; at time 2, the window includes two values; at time 3, the window includes 3 values, and so on.

When the window has a length that is at least two times its minimum size, the window may be resized based on statistical properties of its contents. In this example, the minimum size is 2. Thus, when the window contains at least 4 items, the window contents will be evaluated to determine whether the window should be resized. In the illustrated embodiment, this determination is made by comparing the values in the first half (e.g., the newer data values) to the values in the second half (e.g., the older data values). Here, the first resize determination is made at time 4, and is illustrated by a dividing line that breaks the window into two halves, respectively containing values 30 and 29 ("the older portion") and values 28 and 30 ("the newer portion").

Determining whether to resize the window includes statistically comparing the values of the older and newer portion of the window. In some embodiments, this may include determining whether or not the difference between values of the first portion and values of the second portion is statistically significant. For example, the NCM may perform a t-test or similar statistical analysis to determine whether the mean values of the older and newer portion are the same (equal) or within some acceptable interval of each other. In this example, a t-test shows that the means of the older and newer portions are not statistically different, and so the window is not resized. Other embodiments use techniques other than the t-test. For example, the NCM may determine whether one average is (or is likely) within a number of standard deviations of the other average. Other embodiments use confidence intervals to determine the likelihood that the two averages statistically similar or different, such as by determining whether one average is within a 95% confidence interval around the other average.

As new data samples are obtained, they are added to the window until the maximum window size is reached. This process can be seen in FIG. 2A, as the window grows from a length of 1 up to a maximum length of 8 at time 8. Each time an element is added to the window, the NCM determines whether the window should be resized. In this example, the data is initially quite uniform, varying between 28 and 32 for the first 7 time units. Then, starting at time 8, the network performance drops drastically, as evidenced by the arrival of samples of 0, 0, and 2 at times 8, 9, and 10, respectively.

At time 9, the values of the older and newer portion are sufficiently different to justify resizing the window. The window is resized by halving its size, in this case dropping all samples in the older window half. Next, at time 10, a sample value of 2 is added to the window, resulting in a window length of 5. The two halves of this this window are also compared, resulting in another resize, which is again performed by dropping the samples of the older window half.

The two columns labeled Dynamic and Fixed are used to present an average computed over the dynamic window versus an average computed over a fixed sized window of length 8. As can be seen, the dynamic window average is much more responsive to sudden changes in the data series. This responsiveness is most evident at times 9 and 10, where the dynamic window average converges to near the current data rate within two time cycles, whereas the fixed window average is comparatively very slow to track the change in the data series. The performance of the dynamic window technique is illustrated visually in the graph of FIG. 2B.

Note that when the total length of the window is odd, various approaches to selecting the window portions (e.g., "halves") are contemplated. In the illustrated embodiment, the newer "half" of an odd-sized window is the first floor (N/2) elements of the window, where N is the window size. Other embodiments may instead use the first floor (N/2)+1 elements for the first half. Still other embodiments may not consider the middle item of the window, and instead only compare first and last floor (N/2) elements of the window.

Instead of half (or approximately half) windows, other embodiments may divide the window in other ways. For example, some embodiments may compare the first third against the second two-thirds of the elements in the window. Still other embodiments may consider dynamically adjusting the dividing line according to one or more factors, including window size, sample values, environmental conditions, or the like.

Also, while the illustrated embodiment shows windows having a maximum size of 8 and minimum size of 2, other sizes are contemplated. In some networking embodiments, a minimum size of 8 and a maximum size of 64 is utilized. The minimum and maximum window size can be determined at compile time, start up, or even vary dynamically at run time.

FIG. 2B is a graph that illustrates the performance of a fixed window average. The data for the graph of FIG. 2B comes from the table of FIG. 2A. The underlying data series itself is represented as a light, dotted line connecting triangular points. The fixed window average is represented as a heavy, dashed line connecting diamond-shaped points. Note that the fixed window average is not very responsive to sudden changes in the underlying signal. For example, the fixed window average shows almost no response to the peak at around time 12.

FIG. 2C is a graph that illustrates the performance of a fixed window average. The data for the graph of FIG. 2C comes from the table of FIG. 2A. The underlying data series itself is represented as a light, dotted line connecting triangular points. The dynamic window average is represented as a solid line connecting square points. Note the responsiveness of the dynamic window technique, for example with respect to the peak at around time 12.

FIG. 2D is a graph that compares the performance of a dynamic versus a fixed window average. The data for the graph of FIG. 2D comes from the table of FIG. 2A. This graph is a superposition of the graphs of FIGS. 2B and 2C, above, in order to aid comparison of the fixed and dynamic window approaches. The underlying data series itself is represented as a light, dotted line connecting triangular points. The dynamic window average is represented as a solid line connecting square points. The fixed window average is represented as a heavy, dashed line connecting diamond-shaped points.

In the graph of FIG. 2D, some of the advantages of the dynamic window are evident. First, the dynamic window average responds much more quickly to signal changes than does the fixed window average. The dynamic window is also somewhat responsive to a spurious change (e.g., the value of 25 recorded at time 12) without overcommitting to the change. Because the dynamic window is large when the data values in the series are relatively uniform, the average produced is not strongly impacted by spurious events during periods of uniformity. However, when the data values in the series become highly variable, the dynamic window automatically resizes to become more responsive and reflective of the variability.

2. Example Applications

Although these techniques are primarily described in the context of network congestion, the techniques are equally applicable to other contexts. In general, the technique can be applied when determining congestion for any type of shared resource.

In one example, a dynamic window can be used in an autonomous or semi-autonomous vehicle control system. The dynamic window can be used to determine an average speed on a roadway (the shared resource). The vehicle control system can use the average speed to better regulate the speed of the vehicle, in order to reduce aggressive acceleration and breaking, which tends to cause "traffic waves," which in turn inhibit the smooth flow of traffic. The data values in the window may come from one or more sources, including from other vehicles in the roadway. Also, one or more types of data values may be stored, including vehicle speed, break usage, and the like.

In another example, the dynamic window can be used to regulate computer bus utilization. The dynamic window can be used to detect and measure congestion in the computer bus, which can then assist the bus controller (or other modules using the bus) to modify their behavior to more efficiently use the bus.

In another example, the dynamic window can be used to improve queueing performance for humans, such as in a security checkpoint. When multiple lane options are available, a dynamic window can be used to identify and measure congestion levels in each lane, so that new arrivals can be advised of which lane to enter.

3. Example Processes

FIGS. 3A-3E are example flow diagrams of congestion management performed by example embodiments.

Figure 3A:
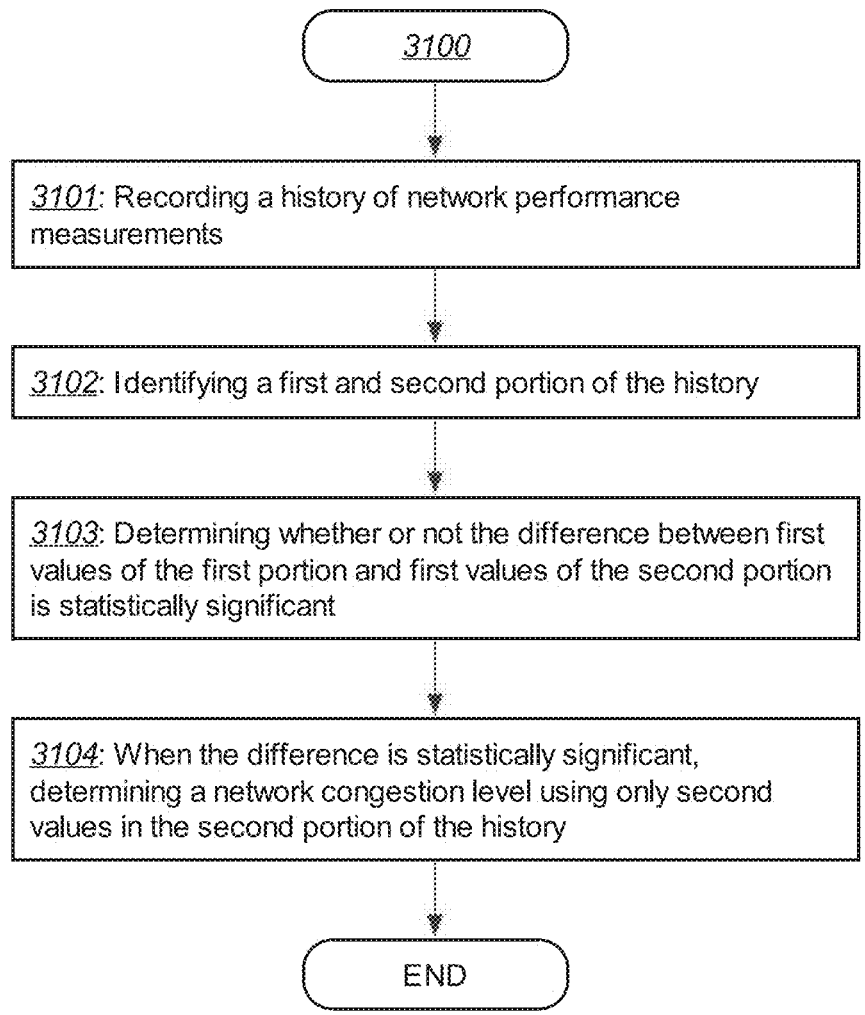
FIGS. 3A-3E are example flow diagrams of congestion management performed by example embodiments.

FIG. 3A is a flow diagram of example logic for managing congestion in a computer network. The illustrated logic in this and the following flow diagrams may be performed by, for example, the network congestion manager 100 described with respect to FIGS. 1 and 4. More particularly, FIG. 3A illustrates a process 3100 that includes the following block(s).

Block 3101 includes recording a history of network performance measurements that includes, for each of multiple times, a first and second value that each represent a different performance characteristic of the network measured at the time. Recording the history may be performed in various ways, such as by obtaining performance data from a network interface, module, hardware unit, or the like. The performance data includes any data that reflects the performance or operation of the network and/or the network interface. Performance data can include indications of whether packets have been successfully sent or received, transmission rate, noise levels, or the like. This embodiment tracks at least two different types of performance data. One is used for discrimination purposes (e.g., to determine when to reduce the size of the history) and the other is used to determine the level of congestion, such as by taking an average.

Block 3102 includes identifying a first and second portion of the history, wherein the first portion corresponds to earlier performance measurements, and wherein the second portion corresponds to later measurements that occur after the measurements represented by the first portion. As discussed above, the history can be divided into halves, so that the content of the halves can be compared to determine whether the variability in the data is high enough to justify reducing the amount of history maintained. Other embodiments may divide the history into portions differently, such as by thirds (e.g., the newer one-third compared to the older two-thirds), by way of a dynamic dividing line (e.g., a line that changes in response to conditions), or the like.

Block 3103 includes determining whether or not the difference between first values of the first portion and first values of the second portion is statistically significant. Different statistical comparisons are contemplated. Some embodiments use a t-test or similar metric to compare averages. Other embodiments may focus on the variance, standard deviation, error rate, confidence interval, or similar.

Block 3104 includes when the difference is statistically significant, determining a network congestion level using only second values in the second portion of the history. Here, the process determines the congestion level only with the newer second values of the history, as the detected dynamism or variability in the data does not justify using older elements anymore. The congestion level is typically determined as an average of the second values in the second portion of the history, although other statistical measures can be determined instead or in addition, such as mean, mode, variance, standard deviation, or the like.

Figure 3B:
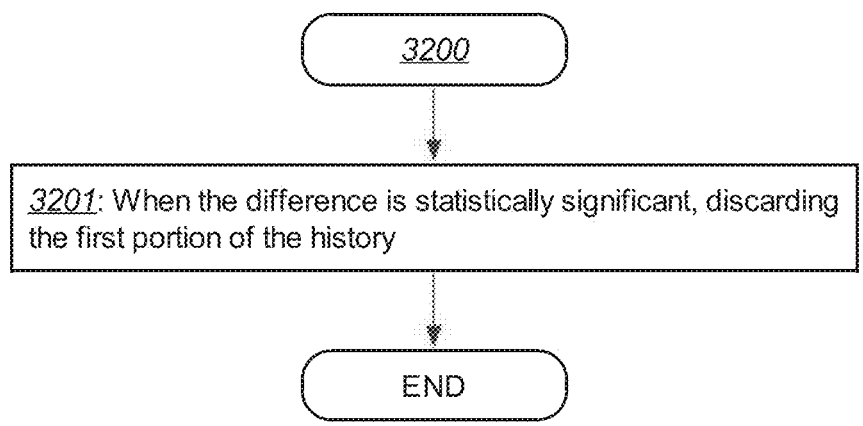

FIG. 3B is a flow diagram of example logic illustrating an extension of process 3100 of FIG. 3A. More particularly, FIG. 3B illustrates a process 3200 that includes the process 3100, and which further includes the following block(s).

Block 3201 includes when the difference is statistically significant, discarding the first portion of the history. The process drops the values in the first portion of the history because those values are no longer relevant in determining the congestion level. As new values are added to the history, the history will grow until it reaches a maximum size or until it is once again pared down due to statistical differences between the values of the first and second portions. Discarding history may include modifying memory by removing data values from a buffer, such as by adjusting begin/end pointers that denote the range of valid values in the buffer.

Figure 3C:
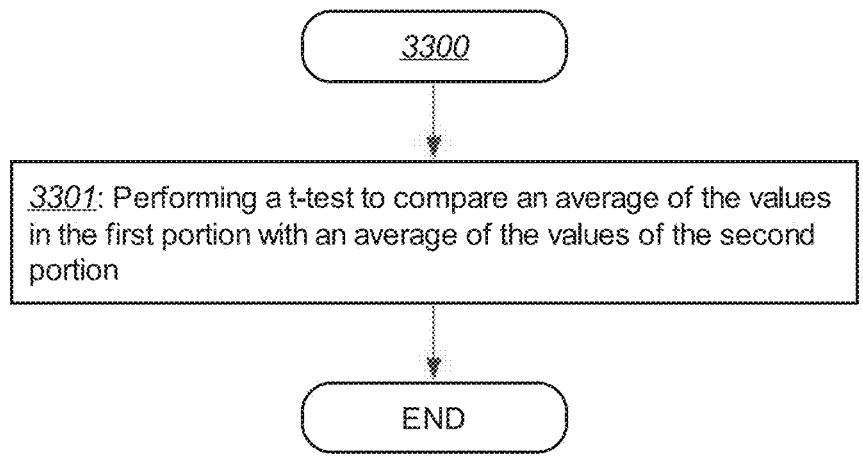

FIG. 3C is a flow diagram of example logic illustrating an extension of process 3100 of FIG. 3A. More particularly, FIG. 3C illustrates a process 3300 that includes the process 3100, wherein the determining whether or not the difference between first values of the first portion and first values of the second portion is statistically significant includes the following block(s).

Block 3301 includes performing a t-test to compare an average of the values in the first portion with an average of the values of the second portion. A t-test can be used to determine whether the difference between the averages of the first and second portion is statistically significant. Different thresholds for statistical significance can be used, such as a p-value of less than or equal to 0.05, 0.01, or the like. Other approaches are contemplated, as discussed above.

Figure 3D:
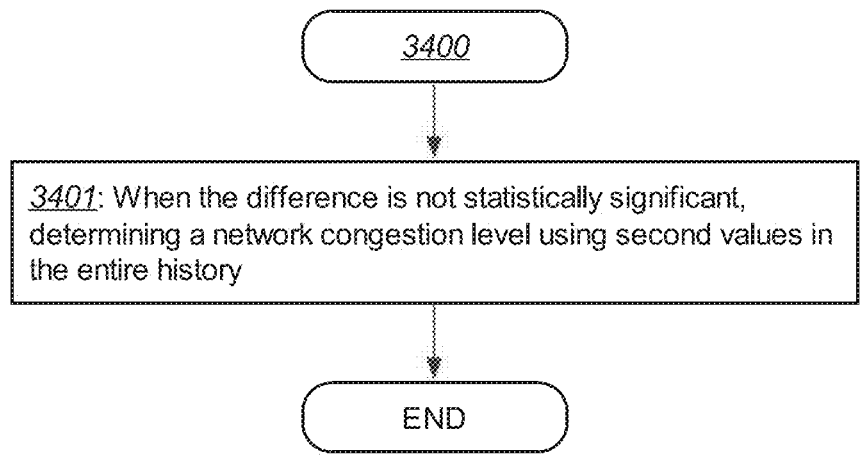

FIG. 3D is a flow diagram of example logic illustrating an extension of process 3100 of FIG. 3A. More particularly, FIG. 3D illustrates a process 3400 that includes the process 3100, and which further includes the following block(s).

Block 3401 includes when the difference is not statistically significant, determining a network congestion level using second values in the entire history. Here, the process determines the congestion level with all of the second values of the history, as the time series data does not warrant excluding the older values. Note that when the portions are compared by determining respective averages, and when the congestion level is also an average, it may be possible to simply return the average of the second values in the first or second portion of the history, since they are likely not statistically different from one another. Of course, such an approach is based on the assumption that the pattern of the second values (which are used to calculate congestion level) follows the pattern of the first values (which are used for discrimination).

Figure 3E:
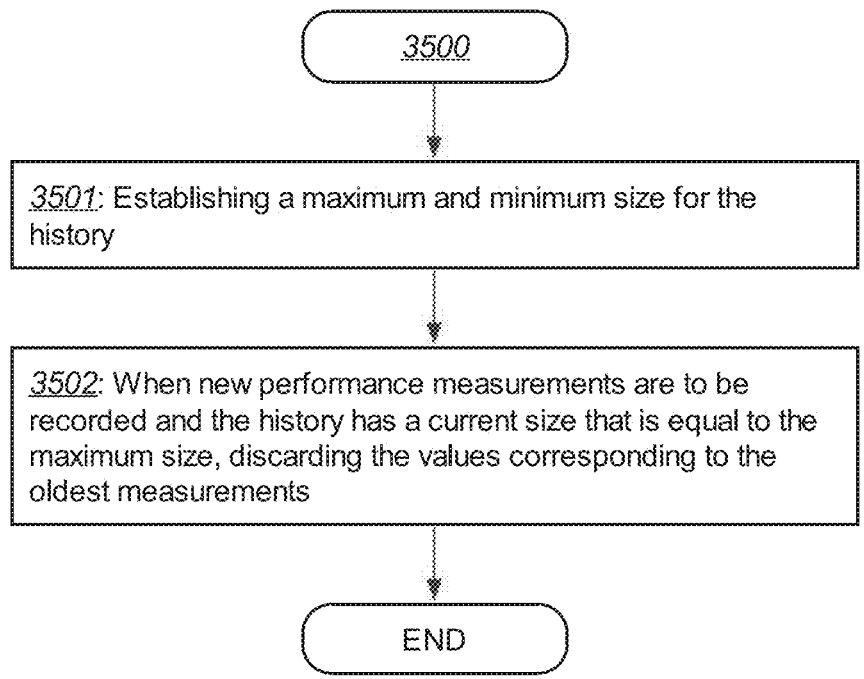

FIG. 3E is a flow diagram of example logic illustrating an extension of process 3100 of FIG. 3A. More particularly, FIG. 3E illustrates a process 3500 that includes the process 3100, and which further includes the following block(s).

Block 3501 includes establishing a maximum and minimum size for the history. In some embodiments, the process determines the maximum and minimum size based on run-time factors. For example, if greater responsiveness is required, then the minimum and maximum size can be decreased. If greater smoothing is required, then the minimum and maximum size can be increased. In other embodiments, the maximum and minimum sizes are fixed, such as at 64 and 8 entries, respectively.

Block 3502 includes when new performance measurements are to be recorded and the history has a current size that is equal to the maximum size, discarding the values corresponding to the oldest measurements. The maximum size operates as capacity limit for the history, so that old items are removed to make space for newer items, in a first-in first-out manner.

4. Example Computing System Implementation

Figure 4:
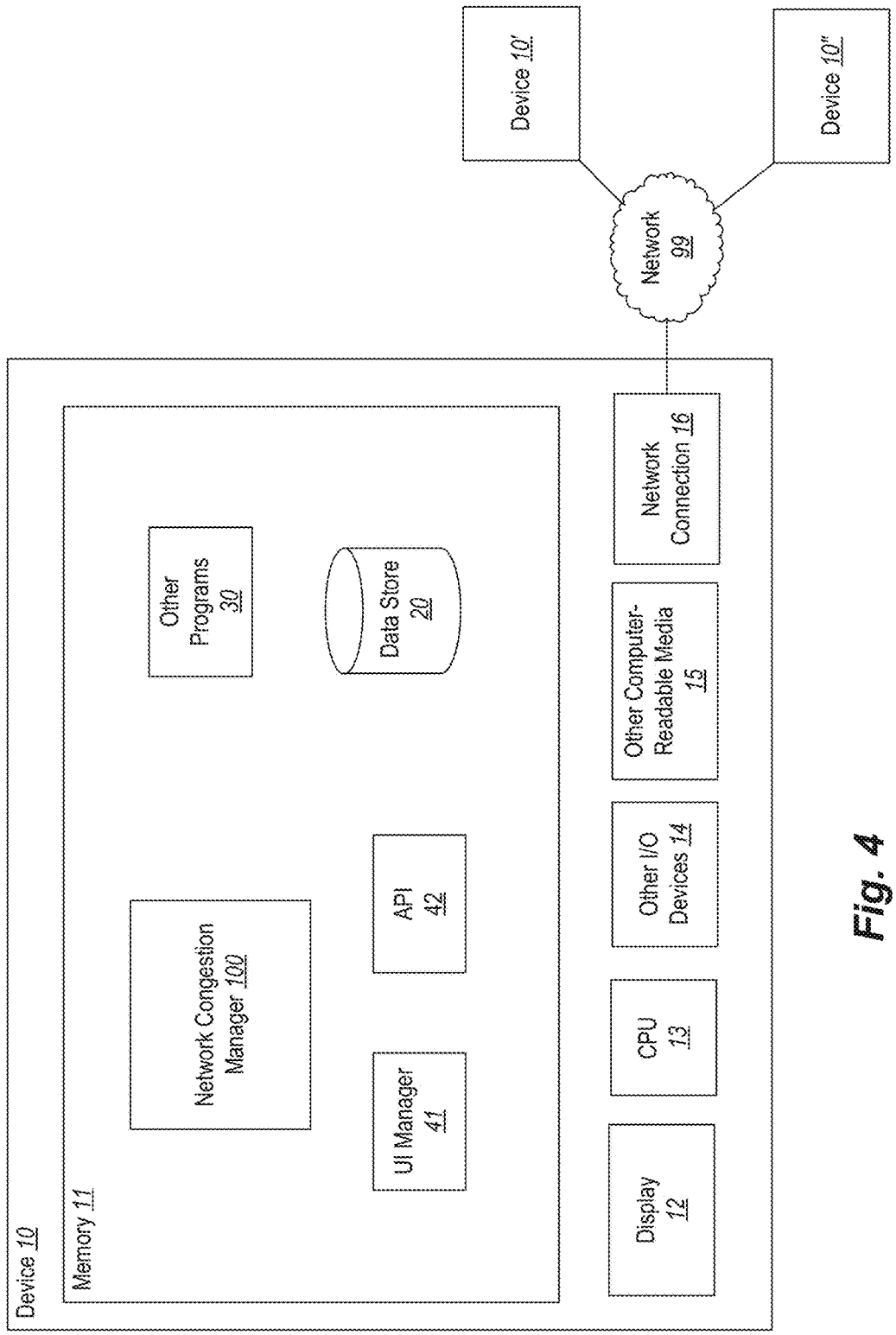
FIG. 4 is a block diagram of an example computing system for implementing and performing network congestion management according to an example embodiment.

FIG. 4 is a block diagram of an example computing system for implementing and performing network congestion management according to an example embodiment. In particular, FIG. 4 shows a computing system or device 10 that may be utilized to implement a network congestion manager 100. The manager 100 may be part of a networking or routing module provided by or as part of a computer or network device (e.g., router, wireless access point). The manager 100 performs one or more of the process described above.

Note that one or more general purpose or special purpose computing systems/devices may be used to implement the described techniques. However, just because it is possible to implement the manager on a general purpose computing system does not mean that the techniques themselves or the operations required to implement the techniques are conventional or well known. In addition, the computing system 10 may comprise one or more distinct computing systems/devices and may span distributed locations. Furthermore, each block shown may represent one or more such blocks as appropriate to a specific embodiment or may be combined with other blocks. Also, the manager 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The manager 100 is shown residing in memory 11. In other embodiments, some portion of the contents, some or all of the components of the manager 100 may be stored on and/or transmitted over the other computer-readable media 15. The manager 100 preferably executes on one or more CPUs 13 and performs the techniques described herein. Other code or programs 30 (e.g., operating system, application programs, etc.) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The manager 100 interacts via the network 99 with other devices 10' and 10". The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The other devices 10' and 10" are constituted similarly to device 10. The devices may be personal computing devices, such as desktop computers, laptop computers, smart phones, tablets, or the like. Alternatively, or in addition, the illustrated devices may be network management or communication devices, such as access points, routers, switches, or the like.

The manager 100 is shown executing in the memory 11 of the computing system 10. Also included in the memory 11 are a user interface manager 41 and an application program interface ("API") 42.

The UI manager 41 provides a view and a controller that facilitate user interaction with the manager 100 and its various components. For example, the UI manager 41 may provide interactive access to the manager 100, such that users can interact with the manager 100, such as by modifying configuration settings (e.g., minimum and maximum window size), viewing logs, or the like. In some embodiments, access to the functionality of the UI manager 41 may be provided via a Web server, possibly executing as one of the other programs 30. In such embodiments, a user operating a Web browser executing on a remote system can interact with the manager 100 via the UI manager 41.

The API 42 provides programmatic access to one or more functions of the manager 100. For example, the API 42 may provide a programmatic interface to one or more functions of the manager 100 that may be invoked by one of the other programs 30 or some other module. In this manner, the API 42 facilitates the development of third-party software, such as user interfaces, plug-ins, adapters (e.g., for integrating functions of the manager 100 into Web applications), and the like.

In addition, the API 42 may be in at least some embodiments invoked or otherwise accessed via remote entities, such as code executing on one of the network devices 10' and 10", to access various functions of the manager 100. For example, a remote router or other network access/management device may obtain the current congestion level from the manager 100. The API 42 may also be configured to provide management widgets (e.g., code modules) that can be integrated into third-party applications and that are configured to interact with the manager 100 to make at least some of the described functionality available within the context of other applications (e.g., mobile apps).

In an example embodiment, components/modules of the manager 100 are implemented using software programming techniques. For example, the manager 100 may be implemented as a "native" executable running on the CPU 13, along with one or more static or dynamic libraries. In other embodiments, the manager 100 may be implemented as instructions processed by a virtual machine that executes as one of the other programs 30. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the manager 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the manager 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums.

Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A method for managing congestion in a computer network, the method comprising: by a network node having a processor, a memory, and a network interface,
   recording in the memory a history of network performance measurements provided by the network interface,
      wherein the history includes a dynamic window defined by a current window size that holds a plurality of samples,
      wherein the plurality of samples is divided between a first portion having a plurality of first samples and a second portion with a plurality of second samples,
      wherein for each of multiple times, each sample is defined by one of a first value and a second value, wherein the first value and the second value each represent a different performance characteristic of the network measured at the time of sampling of the network performance measurement,
      wherein the second portion has a window size that is equal to or less than a predefined maximum size and that is equal to or less than a predefined minimum size, and
      wherein the plurality of samples in the dynamic window is at least equal to two times the minimum size of the second portion;
   identifying the plurality of first samples of the first portion and the plurality of second samples of the second portion, wherein the first portion corresponds to earlier performance measurements, and wherein the second portion corresponds to later performance measurements that occur after the measurements represented by the first portion;
   determining whether or not a difference between the first values of the first portion and the first values of the second portion is statistically significant;
   when the difference is statistically significant, resizing the current window size of the dynamic window to a new window size, wherein the new window size holds only the plurality of second samples; and
   determining a network congestion level using only second values in the second portion of the history.

2. The method of claim 1, further comprising: when the difference is statistically significant, discarding the first portion of the, dynamic window stored in the history.

3. The method of claim 1, wherein the determining whether or not the difference between first values of the first portion and first values of the second portion is statistically significant includes: performing a t-test to compare an average of the values in the first portion with an average of the values of the second portion.

4. The method of claim 1, further comprising: when the difference is not statistically significant, determining the network congestion level using second values in the entire dynamic window stored in the history.

5. The method of claim 1, wherein the first and second values each represent one of a packet transmission success or failure, a packet delivery success or failure, a network data rate, and a network noise level.

6. The method of claim 1, wherein the identifying a first and second portion of the dynamic window stored in the history includes: identifying a first half of the dynamic window stored in the history and a second half of the dynamic window stored in the history, the first half corresponding to the earlier performance measurements, and the second half corresponding to the later performance measurements.

7. The method of claim 1, further comprising:
   establishing a maximum and minimum size for the dynamic window stored in the history; and
   when new performance measurements are to be recorded and the dynamic window has a current size that is equal to the maximum size, discarding the values corresponding to the oldest measurements.

8. The method of claim 7,
   wherein the maximum size is 64 entries; and
   wherein the minimum size is 8 entries.

9. The method of claim 1, wherein determining the network congestion level includes: determining an average based on second values in the dynamic window stored in the history.

10. The method of claim 1, further comprising:
    in response to the determined network congestion level, instructing the network interface to adjust transmission parameters in response.

11. A system configured to manage congestion in a computer network, the system comprising:
    a first network node having a processor, a memory, and a network interface;
    wherein the processor is configured to:
       record in the memory a history of network performance measurements provided by the network interface,
          wherein the history includes, for each of multiple times, a first and second value that each represent a different performance characteristic of the network measured at the time;
       define a dynamic window that is stored in the history,
          wherein the dynamic window has a current window size that holds a plurality of samples,
          wherein the plurality of samples is divided between a first portion having a plurality of first samples and a second portion with a plurality of second samples,
          wherein the second portion has a window size that is equal to or less than a predefined maximum size and that is equal to or less than a predefined minimum size,
          wherein the plurality of samples in the dynamic window is at least equal to two times the minimum size of the second portion;
          wherein the first portion corresponds to earlier performance measurements, and
          wherein the second portion corresponds to later performance measurements that occur after the measurements represented by the first portion;

determine whether or not a difference between first values of the first portion and first values of the second portion is statistically significant;

when the difference is statistically significant, resize the current window size of the dynamic window to a new window size, wherein the new window size holds only the plurality of second samples; and determine a network congestion level using only second values in the second portion of the history.

12. The system of claim 11, wherein the first network node is configured to:

initially transmit packets to a second network node via an intermediary network node, wherein the intermediary network node forwards packets to the second network node; and in response to the determined network congestion level, transmit packets to the second network node directly, without use of the intermediary network node.

13. The system of claim 12, wherein the first network node is configured to:

determine a first network congestion level based on a recorded first history of network performance measurements for a link between the first network node and the second network node;

determine a second network congestion level based on a recorded second history of network performance measurements for a link between the first network node and the intermediary network node; and determine, based on a comparison of the first network congestion level to the second network congestion level, to transmit packets to the second network node directly instead of via the intermediary network node.

14. The system of claim 11, wherein the first network node discards the first portion of the dynamic window stored in the history when the difference is statistically significant, wherein only the plurality of second samples remains in the dynamic window that has been resized to the new window size.

15. The system of claim 11, wherein the first network node determines whether or not the difference between first values of the first portion and first values of the second portion is statistically significant by: determining whether an average of the values of the first portion is within a predetermined confidence interval of an average of the values of the second portion.

16. The system of claim 11, wherein the first network node is further configured to: when the difference is not statistically significant, determine the network congestion level using the second values in the entire history.

17. The system of claim 11, wherein the first and second values each represent one of a packet transmission success or failure, a packet delivery success or failure, a network data rate, and a network noise level.

18. A non-transitory computer-readable medium including contents that are configured, when executed, to cause a network node to perform a method for managing congestion in a computer network, wherein the network node includes a processor, a memory, and a network interface, the method comprising:

by the network node, recording in the memory a history of network performance measurements provided by the network interface, wherein the history includes, for each of multiple times, a first and second value that each represent a different performance characteristic of the network measured at the time;

defining a dynamic window that is stored in the history, wherein the dynamic window has a current window size that holds a plurality of samples, wherein the plurality of samples is divided between a first portion with a plurality of first samples and a second portion with a plurality of second samples, wherein the second portion has a window size that is equal to or less than a predefined maximum size and that is equal to or less than a predefined minimum size, wherein the plurality of samples in the dynamic window is at least equal to two times the minimum size of the second portion, and wherein the first portion corresponds to earlier network performance measurements, and wherein the second portion corresponds to later network measurements that occur after the measurements represented by the first portion;

determining whether or not the difference between first values of the first portion and first values of the second portion is statistically significant;

when the difference is statistically significant, resizing the current window size of the dynamic window to a new window size, wherein the new window size holds only the plurality of second samples; and determining a network congestion level using only second values in the second portion of the history.

19. The non-transitory medium of claim 18, wherein the method further comprises:

discarding the first portion of the history when the difference is statistically significant;

when the difference is not statistically significant, determining the network congestion level using second values in the entire history;

establishing a maximum and minimum size for the history; and when new network performance measurements are to be recorded and the history has a current size that is equal to the maximum size, discarding the values corresponding to the oldest measurements;

wherein the first and second values each represent one of a packet transmission success or failure, a packet delivery success or failure, a network data rate, and a network noise level;

wherein the identifying the first and second portion of the history includes identifying a first half of the history and a second half of the history, the first half corresponding to the earlier performance measurements, and the second half corresponding to the later performance measurements.

20. The non-transitory medium of claim 19, wherein the method further comprises:

determining a first congestion level based on a recorded first history of performance measurements for a link between the first network node and a second network node;

determining a second congestion level based on a recorded second history of performance measurements for a link between the first network node and an intermediary network node; and determining, based on a comparison of the first congestion level to the second congestion level, to transmit packets to the second network node directly instead of via the intermediary network node.

21. The method of claim 1,
when a number of the plurality of samples of the dynamic window is an even number of samples, the window size of the second portion is the same as a window size of the first portion, and
when a number of the plurality of samples of the dynamic window is an odd number of samples, the window size of the second portion is one less that a window size of the first portion.

22. The method of claim 1, the window size of the second portion is one third of the window size of the dynamic window.

23. The method of claim 1, where in response to receiving a new network performance measurement defined by one of the first value or the second value, the method further comprising:
discarding an oldest one of the of the second portion;
adding the new network performance measurement into the second portion; and
determining a new network congestion level using only the second values in the second portion of the resized dynamic window.

24. The method of claim 1, further comprising:
determining a desired run-time factor at the network node;
increasing the maximum size and the minimum size of the window size of the second portion when the run-time factor is to be increased; and
decreasing the maximum size and the minimum size of the window size of the second portion when the run-time factor is to be decreased.

* * * * *

UNITED STATES PATENT AND TRADEMARK OFFICE
CERTIFICATE OF CORRECTION

PATENT NO.       : 10,153,980 B2
APPLICATION NO.  : 15/213759
DATED            : December 11, 2018
INVENTOR(S)      : A. Riley Eller et al.

It is certified that error appears in the above-identified patent and that said Letters Patent is hereby corrected as shown below:

In the Claims

Claim 2, Column 13, Line 63, please correct as follows:
portion of the dynamic window stored in the history.

Signed and Sealed this
Twenty-sixth Day of February, 2019

Andrei Iancu
*Director of the United States Patent and Trademark Office*